Nov. 4, 1924. 1,514,380
C. GIRL
AUTOMOBILE BUMPER
Filed Jan. 31, 1923
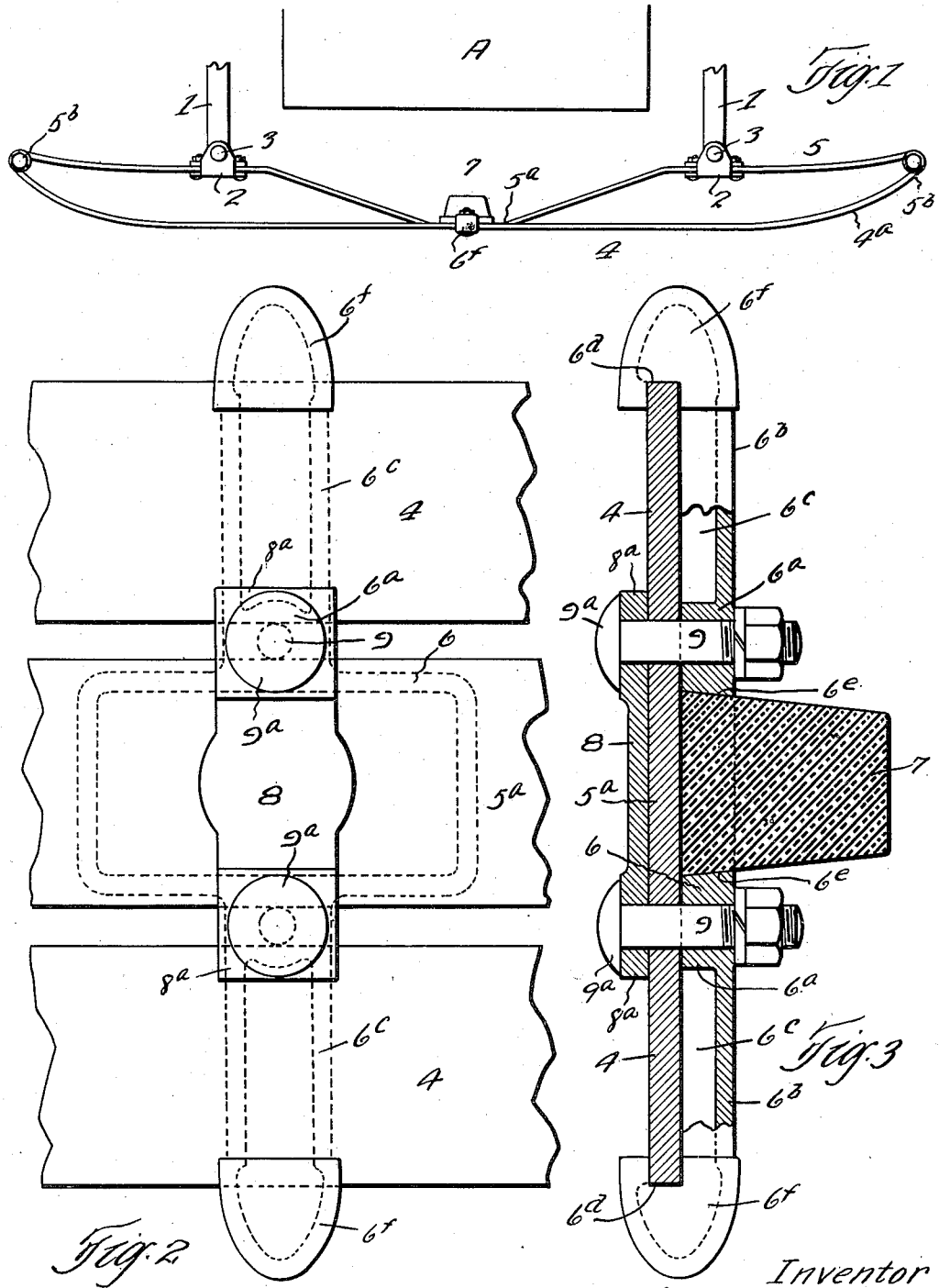
Inventor
Christian Girl
By Hull, Buck & West,
Attys.

Patented Nov. 4, 1924.

1,514,380

UNITED STATES PATENT OFFICE.

CHRISTIAN GIRL, OF KALAMAZOO, MICHIGAN, ASSIGNOR TO THE C. G. SPRING & BUMPER COMPANY, OF DETROIT, MICHIGAN, A CORPORATION OF DELAWARE.

AUTOMOBILE BUMPER.

Application filed January 31, 1923. Serial No. 615,996.

*To all whom it may concern:*

Be it known that I, CHRISTIAN GIRL, a citizen of the United States, residing at Kalamazoo, in the county of Kalamazoo and State of Michigan, have invented a certain new and useful Improvement in Automobile Bumpers, of which the following is a full, clear, and exact description, reference being had to the accompanying drawings.

This invention relates to bumpers for vehicles, such as automobiles, and has for its general object to construct a bumper in such manner that, under extreme deflection of the central portion thereof, a minimum amount of damage will be sustained by the radiator. A further object of the invention is to accomplish the foregoing general object in a simple, convenient, and relatively inexpensive manner.

In the drawings forming part hereof, my invention is shown as applied to a bumper comprising an impact section made of parallel bars and a rear or auxiliary section consisting of a bar connected at its ends to the ends of the impact-section bars and having a central portion projected toward and between and connected to the central portions of the impact bars. It will be understood, however, that my invention may be used in connection with various types and constructions of bumpers. In the aforesaid drawings, Fig. 1 represents a plan view of a bumper, such as referred to, having my invention applied thereto, the bumper being shown as attached to its supporting arms; Fig. 2 a detail in elevation of the central front portion of the said bumper; and Fig. 3 a detail in sectional elevation through the central portion of said bumper.

Describing the various parts illustrated herein by reference characters, 1 denotes a pair of supporting arms or brackets by means of which the bumper is supported, preferably through clamps 2 which are adjustably mounted upon the rear or auxiliary bar of the bumper and are pivotally connected to the ends of the arms or brackets 1, as indicated at 3.

The front or impact section, referred to hereinbefore, comprises a pair of vertically spaced parallel bars 4, the said bars extending the full longitudinal extent of the bumper, and a rear or auxiliary bar 5 also extending the full length of the bumper and connected at its ends to and between the ends of the bars 4 by means of bolts $5^b$. The ends of the bars 4 are curved rearwardly, as shown at $4^a$. The intermediate portion of the bar 5 is projected forwardly, in a general V-shape, there being a central portion $5^a$ which is projected between the central portions of the bars 5. For convenience of description, the bumper will be assumed to be applied to the front of an automobile and the terms "front" and "rear" will be used in referring to the positions of the parts thereof, but without any intention of limiting the application of the bumper to such part of the vehicle.

The bars 4 and 5 are preferably of the flat-plate type, such as are used in the manufacture of ordinary vehicle springs; and the central portions of the bars are connected by the combined clamping, spacing, and buffer-supporting means shown in detail in Figs. 2 and 3. The complete clamping, spacing, and buffer-supporting device comprises an upper L-shaped member adapted to be applied to the uppermost bar and a lower L-shaped member adapted to be applied to the lowermost bar (the said members preferably being formed as parts of a continuous rear clamping and spacing bracket adapted to be applied to the rear faces of the bars and to overhang the front faces of the top and bottom bars) together with a plate adapted to be applied to the front face of the intermediate bar, to overlap the front faces of the top and bottom bars, and to be detachably connected to the rear member.

The rear bracket has a central portion 6 in the shape of a rectangular frame which is adapted to bear against the rear face of the central portion $5^a$ of the auxiliary plate or bar 5. In this central frame portion there is mounted a rubber buffer 7, the base of which bears against the central portion of the plate $5^a$, the buffer projecting rearwardly, or toward the radiator A. The top and the bottom of the frame 6 are extended upwardly and downwardly across the spaces between the intermediate bar 5 and the bars 4 above and below the same, as indicated at $6^a$. For lightness of construction, the upper and lower members $6^b$ of the rear bracket are channeled, the flanges $6^c$ of the channels bearing against the rear faces of the plates 4. The upper and lower ends of the rear bracket $6-6^f$ are provided each with notches 6ᵈ adapted to receive the upper and lower edges of the upper and lower bars or plates, respectively.

Cooperating with the rear bracket 6—6ᵈ is a front clamping plate 8 which is of sufficient length to extend across the central portion 5ᵃ of the rear or auxiliary bar and to engage the lower and upper edges of the front faces of the bars 4 above and below the auxiliary bar, respectively. The plate 8 is connected to the rear bracket 6—6ᵈ, by means of bolts 9 having heads 9ᵃ bearing against seats 8ᵃ on the plate 8, the bolts extending through aligned bolt holes in the plate 8 and in the parts 6ᵃ of the rear bracket. The bolts extend between the top and the bottom of the plate 5 and the bottom and the top of the plates above and below the same, respectively, and may serve as means for spacing the central portions of the said bars or plates.

It will be observed that the opposite faces 6ᵉ of the frame 6 converge rearwardly, and that the corresponding portions of the faces of the block or buffer 7 are correspondingly tapered, enabling the said buffer to be conveniently applied to the frame provided therefor and to be conveniently removed from such frame, if desirable.

It will be noted that the buffer engages the plate 5 directly and serves, through the adjustment of the bolts 9, to press the central portion 5ᵃ of the plate 5 against the clamping plate 8. By this arrangement, the vibrations of the central portions of the bumper are cushioned, the central portion of such plate being yieldingly pressed against the plate 8.

Should the central portion of the bumper receive a blow of sufficient force to cause it to contact with the radiator, the buffer 7 will serve to cushion the blow delivered to the radiator and will prevent serious, if any, injury thereto.

Having thus described my invention, what I claim is:

1. An automobile bumper having at its central portion a resilient buffer adapted, on severe deflection of the central portion of the said bumper, to engage the portion of the vehicle located opposite thereto.

2. An automobile bumper comprising a resilient bar, and a buffer of yieldable material secured to the central portion of said bar and adapted, under severe deflection of said bar, to engage the portion of the vehicle opposite thereto.

3. An automobile bumper comprising a resilient bar having a rubber buffer secured to the central portion thereof and projecting toward the vehicle.

4. An automobile bumper comprising an impact section having a pair of vertically-spaced bars and an auxiliary section comprising a bar connected at its ends to the impact bars and having its central portion projected between the central portions of such impact bars, means for clamping together the central portions of said bars, and a resilient buffer carried by the central portion of the said clamping means and projecting toward the vehicle.

5. An automobile bumper comprising an impact section and an auxiliary section comprising a bar connected at its ends to the impact section and having its central portion connected to the central portion of said impact section, and a resilient buffer carried by the central portion of the auxiliary section and projecting toward the vehicle.

6. An automobile bumper comprising an impact section having a pair of vertically spaced bars and an auxiliary section comprising a bar connected at its ends to and between the impact bars, a device for clamping together the central portions of said bars, the said device having a frame at its central portion presented toward the vehicle, and a resilient buffer mounted in said frame.

7. An automobile bumper comprising an impact section and an auxiliary section comprising a bar connected at its ends to the impact section, a device for clamping together the central portions of said sections, the said device having a frame at its central portion presented toward the vehicle, and a resilient buffer mounted in said frame.

8. An automobile bumper comprising a resilient bar having on one face thereof a frame provided with an opening the walls whereof converge toward the portion of the vehicle to be opposed thereto, and a rubber buffer having a portion cooperating with and seated in such opening against said bar.

9. An automobile bumper comprising an impact section having a pair of vertically spaced bars and an auxiliary section comprising a bar connected at its ends to the ends of the first mentioned bars and having its central portion projected toward and between such bars, a clamping bracket adapted to engage the rear or vehicle-facing sides of the central portions of said bars, a plate applied to the opposite faces of the central portions of said bars and connected to said bracket, and a buffer of yieldable material carried by the central portion of the said bracket and adapted to engage the central portion of the auxiliary bar.

10. An automobile bumper comprising an impact section having a pair of vertically spaced bars, an auxiliary section comprising a bar connected at its ends to the ends of the first mentioned bars and having its central portion projected toward and between such bars, a clamping bracket adapted to be applied to the central portions of all of said bars and against the vehicle-facing sides thereof, the said bracket having at its central portion a frame, a buffer of resilient material mounted in said frame and projecting therefrom toward the vehicle and also adapted to engage the central portion of the auxiliary bar, a plate applied to the opposite faces of the said bars from the said bracket, and bolts connecting the said plate and bracket and extending between the said bars.

11. An automobile bumper comprising an impact section having a pair of vertically spaced bars and an auxiliary section comprising a bar connected at its ends to the ends of the first mentioned bars and having its central portion projected toward and between such bars, a clamping device comprising a bracket adapted to engage the rear or vehicle-facing sides of the central portions of all of said bars and provided with seats at the top and bottom thereof for the top and bottom edges of the top and bottom bars, respectively, and a plate applied to the opposite faces of the central portions of said bars and connected to said bracket.

In testimony whereof, I hereunto affix my signature.

CHRISTIAN GIRL.